United States Patent
Maslov et al.

(10) Patent No.: US 6,949,908 B2
(45) Date of Patent: Sep. 27, 2005

(54) FAULT-TOLERANT ELECTRIC MOTOR CONTROL SYSTEM

(75) Inventors: Boris A. Maslov, Reston, VA (US); Guohui Yuan, Gaithersburg, MD (US)

(73) Assignee: Wavecrest Laboratories, LLC, Dulles, VA (US)

(*) Notice: Subject to any disclaimer, the term of this patent is extended or adjusted under 35 U.S.C. 154(b) by 0 days.

(21) Appl. No.: 10/678,133

(22) Filed: Oct. 6, 2003

(65) Prior Publication Data

US 2005/0073273 A1 Apr. 7, 2005

(51) Int. Cl.$^7$ .................................................. H02P 1/24
(52) U.S. Cl. ..................... 318/727; 318/434; 318/439; 318/801
(58) Field of Search ................ 318/138, 139, 318/254, 434, 439, 700, 727, 801, 823; 363/37, 56, 89; 702/58, 64; 324/546, 772

(56) References Cited

U.S. PATENT DOCUMENTS

| | | | | |
|---|---|---|---|---|
| 3,961,688 A | * | 6/1976 | Maynard | 187/289 |
| 4,434,389 A | | 2/1984 | Langley et al. | |
| 5,357,181 A | * | 10/1994 | Mutoh et al. | 318/139 |
| 5,436,545 A | * | 7/1995 | Bahr et al. | 318/727 |
| 5,457,374 A | * | 10/1995 | Branecky et al. | 318/801 |
| 5,491,622 A | * | 2/1996 | Carosa | 363/56.02 |
| 5,694,010 A | * | 12/1997 | Oomura et al. | 318/254 |
| 5,793,623 A | * | 8/1998 | Kawashima et al. | 363/56.05 |
| 5,814,957 A | * | 9/1998 | Yoshida | 318/439 |
| 6,054,827 A | * | 4/2000 | Takatsuka et al. | 318/474 |
| 6,153,993 A | * | 11/2000 | Oomura et al. | 318/434 |
| 6,389,373 B1 | * | 5/2002 | Ohya | 702/189 |
| 6,611,771 B1 | * | 8/2003 | Habetler et al. | 702/58 |
| 6,677,724 B1 | * | 1/2004 | Kim et al. | 318/700 |
| 6,683,435 B1 | * | 1/2004 | Liang et al. | 318/727 |
| 2002/0117990 A1 | * | 8/2002 | Sawada et al. | 318/727 |
| 2004/0085787 A1 | * | 5/2004 | Perreault et al. | 363/89 |

FOREIGN PATENT DOCUMENTS

| | | |
|---|---|---|
| EP | 1 050 425 A2 | 11/2000 |
| WO | WO 01/97355 A1 | 12/2001 |

* cited by examiner

*Primary Examiner*—Paul Ip
(74) *Attorney, Agent, or Firm*—McDermott Will & Emery LLP

(57) ABSTRACT

The present invention offers a novel control system for a multiphase motor. The control system involves energization circuitry for energizing each phase winding, and a control circuit for defining phase currents for individual phases of the motor to generate control signals applied to the energization circuitry for energization of the phase windings. When at least one phase of the motor fails, a mode selection circuit enables the control circuit to operate either in a non-correction mode or in a fault-correction mode. In the non-correction mode of operation, phase currents for phases that remain operational are maintained unmodified. In the fault-correction mode, the phase currents for the remaining phases are modified in accordance with pre-set parameters.

22 Claims, 9 Drawing Sheets

FAULT-TOLERANT ELECTRIC MOTOR CONTROL SYSTEM

FIELD OF THE INVENTION

The present application relates to electric motors, and in particular, to a control system for providing fault-tolerant operation of a multiphase electric motor.

BACKGROUND OF THE INVENTION

For an electric motor that performs critical functions, for example in military applications, it is essential that the motor continues its operation even in the event of a failure of a phase. Therefore, comprehensive fault tolerance becomes a major aspect of the motor design. Conventionally, a motor is equipped with redundant elements to support fault-tolerant operation.

For example, U.S. Pat. No. 4,434,389 discloses a brushless DC motor having a permanently magnetized rotor and a stator with redundant sets of windings. The rotor is formed with four or more magnetic poles. Two sets of stator windings being used in a four-pole motor, three sets being used in a six-pole motor, and four sets being used in an eight-pole motor. The windings in each set are connected in wye, delta or star configuration for three-phase excitation. The switching of the currents in the individual windings in each set of windings is accomplished mechanically by a commutator, or electronically by commutation circuits coupled to individual sets of windings. Sensing of the relative position between moving and stationary portions of the motor is accomplished by independent sets of position sensors coupled independently to corresponding commutation circuits. The commutation circuits may be operated simultaneously for maximum torque, with reduced torque being available in the event of failure of one or more circuits or windings.

Hence, the redundancy is provided at the expense of complex winding patterns causing higher cost of design and operation.

Accordingly, it would be desirable to develop a control system that would provide fault-tolerant operation of a motor without redundant elements.

DISCLOSURE OF THE INVENTION

The present invention offers a novel control system for a multiphase motor that does not need redundant elements in order to continue its operation when a phase fails. In the event of a phase failure, the control system of the present invention enables the motor to operate without a need to carry out any fault correction procedure.

Moreover, the control system of the present invention gives the user high flexibility by providing a choice between operating without fault correction or performing an appropriate fault correction procedure. In addition, fault-correction parameters defining motor characteristics when a phase is lost may be customized in accordance with user's preferences.

The control system is provided for controlling a motor having a plurality of stator phase components and a rotor. Each stator phase component comprises a phase winding formed on a core element. The control system comprises energization circuitry connected to the stator phase windings for energizing each phase winding, and a control circuit for defining phase currents for individual phases of the motor to generate control signals applied to the energization circuitry for energization of the phase windings. When at least one phase of the motor fails, a mode selection circuit enables the control circuit to operate either in a non-correction mode or in a fault-correction mode.

Whereas in the non-correction mode of operation, phase currents for phases that remain operational are maintained unmodified; in the fault-correction mode, the phase currents for the remaining phases are modified in accordance with pre-set parameters. The control circuit may disable energization of the phase winding corresponding to the failed phase.

In accordance with an embodiment of the invention, the pre-set parameters for phase current modification in the fault-correction mode may include the maximum current magnitude at a phase angle corresponding to the failed phase, and the minimum current magnitude at a phase angle shifted by 90 degrees with respect to the failed phase. Based on the pre-set parameters, the control circuit may modify phase current for a phase that remains operational after a failure of another phase in accordance with a phase angle distance or offset between the remaining phase and the failed phase.

The pre-set parameters for phase current modification may be customized in accordance with user's preferences to achieve a desired balance between total torque of the motor and torque ripple.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE INVENTION

Figure 1:
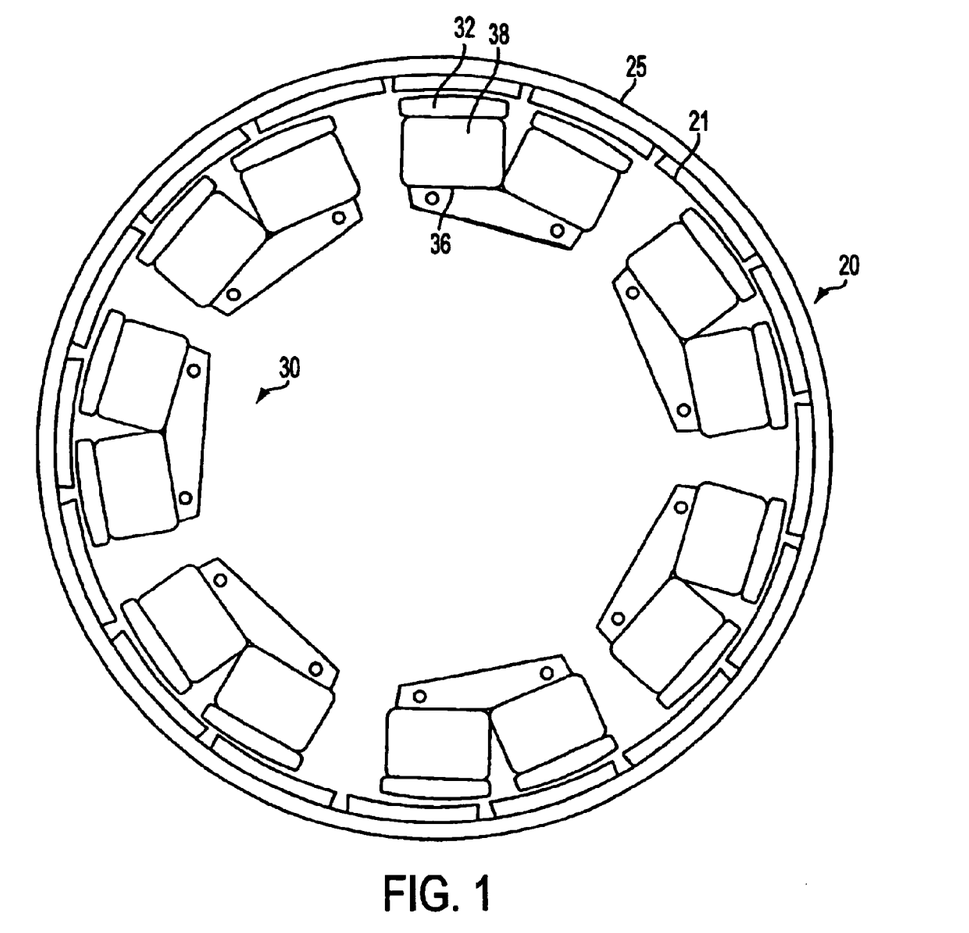
FIG. 1 is an exemplary view showing rotor and stator elements in a configuration that may be employed in the present invention.

The present invention is applicable to controlling an electric motor such as disclosed in the copending U.S. application Ser. No. 09/826,422 of Maslov et al., filed Apr. 5, 2001 and incorporated herewith by reference, although the invention can be used with various other permanent magnet motors and switched-reluctance motors. FIG. 1 is an exemplary view showing rotor and stator elements of a motor 10 as described in that application, the disclosure of which has been incorporated herein. Rotor member 20 is an annular ring structure having permanent magnets 21 substantially evenly distributed along cylindrical back plate 25.

The permanent magnets are rotor poles that alternate in magnetic polarity along the inner periphery of the annular ring. The rotor surrounds a stator member 30, the rotor and stator members being separated by an annular radial air gap. Stator 30 comprises a plurality of electromagnet core segments of uniform construction that are evenly distributed along the air gap. Each core segment comprises a generally U-shaped magnetic structure 36 that forms two poles having surfaces 32 facing the air gap. The legs of the pole pairs are wound with windings 38, although the core segment may be constructed to accommodate a single winding formed on a portion linking the pole pair.

Each stator electromagnet core structure is separate, and magnetically isolated, from adjacent stator core elements. The stator elements 36 are secured to a non-magnetically permeable support structure, thereby forming an annular ring configuration. This configuration eliminates emanation of stray transformer flux effects from adjacent stator pole groups. The stator electromagnets are thus autonomous units comprising respective stator phases. The concepts of the invention described below are also applicable to other permanent magnet motor structures, including a unitary stator core that supports all of the phase windings.

Figure 2:
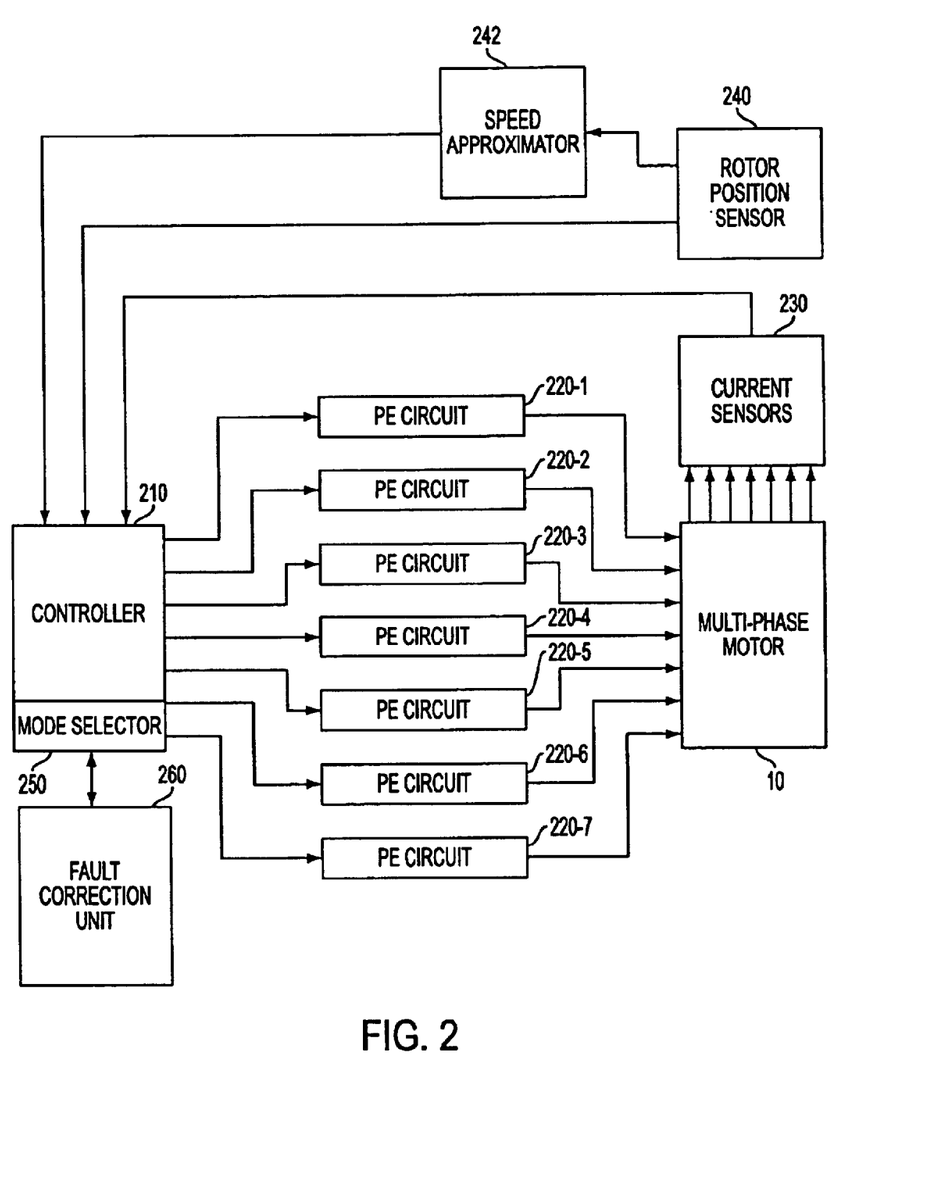
FIG. 2 is a simplified block diagram illustrating the fault-tolerant control system of the present invention.

FIG. 2 is a block diagram of a motor control system in accordance with the present invention. The control system includes controller 210 for controlling multiphase motor 10 that comprises rotor 20 and stator 30 shown FIG. 1. The stator has a plurality of phase windings that are switchably energized by driving currents supplied by power electronic (PE) circuits 220. For example, FIG. 2 shows PE circuits 220-1 to 220-7 provided for seven stator phase windings. However, the present invention is applicable to any number of motor phases.

Each PE circuit may include an electronic switch set controlled by controller 210 via a driver element. The switch sets may comprise a plurality of MOSFET H-Bridges, such as International Rectifier IRFIZ48N-ND. The gate driver may comprise Intersil MOSFET gate driver HIP4082IB.

The controller 210 has one or more user inputs and a plurality of inputs for motor conditions sensed during operation. Current in each phase winding is sensed by a respective one of a plurality of current sensors 230 whose outputs are provided to the controller 210. The controller may have a plurality of inputs for this purpose or, in the alternative, signals from the current sensors may be multiplexed and connected to a single controller input. Hall effect current sensors, such as F. W. Bell SM-15, may be utilized for currents sensors 230.

Rotor position sensor 240 is connected to another input of the controller 210 to provide position signals thereto. The position sensor may comprise any known sensing means, such as a Hall effect devices (Allegro Microsystems 92B5308), giant magneto resistive (GMR) sensors, capacitive rotary sensors, reed switches, pulse wire sensors including amorphous sensors, resolvers, optical sensors and the like. The output of the position sensor 240 may be applied to a speed approximator 242, which converts the position signals to speed signals to be applied to another input of the controller 210.

The controller 210 may comprise a microprocessor or equivalent microcontroller, such as Texas Instrument digital signal processor TMS320LF2407APG. In order to develop desired phase currents, the controller 210 generates the following control voltage:

$$V_i(t) = L_i dI_{di}/dt + R_i I_i + E_i + k_{si} e_i$$

where
  $V_i(t)$ is the voltage across the phase winding;
  $I_{di}(t)$ is the desired phase current to be produced to obtain desired torque;
  $I_i(t)$ is the phase current;
  $R_i$ is the winding resistance;
  $E_i(t)$ is the back-EMF;
  $L_i$ is the winding self-inductance;
  $k_{si}$ is the current loop feedback gain; and
  $e_i$ is the phase current error.

The control voltage Vi (t) at the output of the controller 210 represents a calculated voltage value required to obtain the user's requested torque. In operation, the controller 210 defines phase current Idi (t) in each phase required to obtain the desired torque, and produces control signals Vi (t) for each phase based on the expression presented above. The control signals Vi (t) are successively supplied to the PE circuits 220 for individual energization of respective phase windings. Via the gate drivers, switch sets in the respective PE circuits 220 are activated so that the sequence in which windings are selected comports with a sequence established in the controller. Each successive control signal Vi (t) is related to the particular current sensed in the corresponding phase winding. The controller operation is disclosed in more detail in the copending U.S. application Ser. No. 10/173,610 of Maslov et al., filed Jun. 19, 2002 and incorporated herewith by reference The controller 210 includes a fault-tolerant mode selector 250 for selecting a mode of fault-tolerant operations performed when at least one phase of the motor 10 fails. The fault-tolerant mode selector 250 may be a register or an electronic circuit programmable by the user or controllable in accordance with motor conditions. Alternatively, the mode selector 250 may be arranged outside the controller 210. As described in more detail below, in the event of a phase failure, the fault-tolerant mode selector 250 enables the controller 210 to operate in one of the following fault-tolerant modes of operation: non-correction mode and fault-correction mode.

In the non-correction mode, when at least one phase fails, the controller 210 does not modify the phase currents Idi (t) in the remaining phases of the motor 10. Instead, it may control the PE circuit 220 corresponding to the failed phase so as to disable energization of the respective phase winding.

In the fault-correction mode, in the event of a phase failure, the controller 210 interacts with a fault-correction unit 260 to modify the phase currents Idi (t) in the phases that remain operational in accordance with a prescribed fault-correction algorithm. For example, the fault correction unit 260 may comprise a look-up table containing a predetermined set of parameters for modifying the phase currents Idi (t) in the phases that remain operational. As described below, this set of parameters may be customized in accordance with user's preferences.

Figure 3:
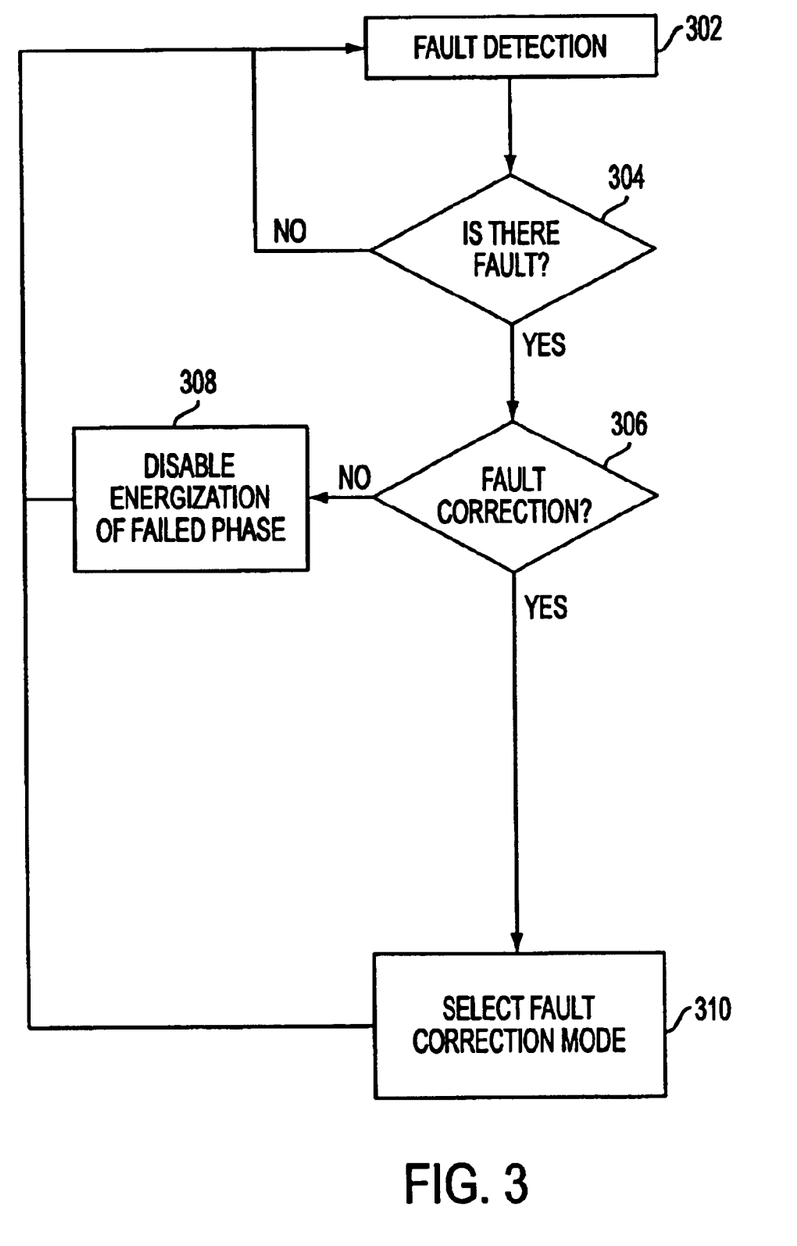
FIG. 3 is a flow-chart illustrating a fault-tolerant mode selection procedure of the present invention.

FIG. 3 is a simplified flow-chart illustrating fault-tolerant operation of the motor control system of the present invention. The controller 210 monitors its inputs to detect a failure of a motor phase (step 302). For example, a phase failure may be detected using current sensors 230 that measure phase current Ii(t) for each phase of the motor. If any current sensor 230 detects abnormal value of phase current Ii(t) for a predetermined period of time, the controller 210 detects a phase failure condition and identify a failed phase (step 304).

For example, if phase current Ii(t) for a phase suddenly drops to zero and does not return to its normal trajectory for a predetermined time period, the controller 210 determines that the circuit for the respective phase is open. Further, if phase current Ii(t) for a phase suddenly increases over a pre-set limit and does not return to its normal trajectory for a predetermined time period, the controller 210 determines that the circuit for the respective phase is shorted.

Accordingly, to detect a failure of a phase, the controller 210 may monitor a phase current error for the respective phase. The phase current error is a difference between the desired phase current Idi(t) and the actual phase current Ii(t) measured by the respective current sensor. The desired phase current Idi (t) for each phase is defined by the controller 210 in accordance with a torque requirement, based on the position and speed determined by the position sensor 240 and the speed approximator 242. The controller 210 considers any phase to be a failed phase, if the absolute value of a phase current error for that phase exceeds a pre-set limit for a predetermined time period.

When a phase failure is detected, the controller 210 checks the fault-tolerant mode selector 250 to establish a prescribed fault-tolerant mode of operation (step 306). The mode selector 250 may be pre-programmed by the user to request the controller 210 to operate either in a non-correction mode or in a fault correction mode if a phase failure condition is detected.

Alternatively, the mode selector 250 may be automatically controlled to select an appropriate fault-tolerant mode of operation depending on motor conditions at the time when a phase failure is detected. For example, when at least one phase fails, the mode selector 250 may be controlled to set a non-correction mode of operation, if phase currents Ii(t) for a predetermined number of remaining phases exceed a threshold level. In this case, modification of phase current values for the remaining phases would reduce the total torque value of the motor. In certain situations, the total torque reduction may be undesirable.

Accordingly, when a failure of a phase is detected, the controller 210 may compare phase current values detected by the current sensors 230 for the remaining phases with a threshold level. If the phase current values for a predetermined number of phases exceed the threshold level, the controller 210 controls the mode selector 250 to set a non-correction mode. Otherwise, a fault-correction mode may be set.

Hence, if in step 306, the controller 210 determines that the fault-correction mode is not set, it switches into the non-correction mode of operation (step 308). In the non-correction mode of operation, the controller 210 may control the PE circuit 220 corresponding to the failed phase to disable energization of the respective phase winding. In the non-correction mode, motor parameters relating to the phases that remain operational, including respective phase currents, are not modified despite a phase failure.

If in step 306, the controller 210 determines that the fault-correction mode is set, it switches into the fault-correction mode of operation (step 310). In the fault-correction mode, the controller 210 modifies the desired phase currents Idi (t) in the phases that remain operational in accordance with a prescribed fault-correction algorithm.

Figure 4:
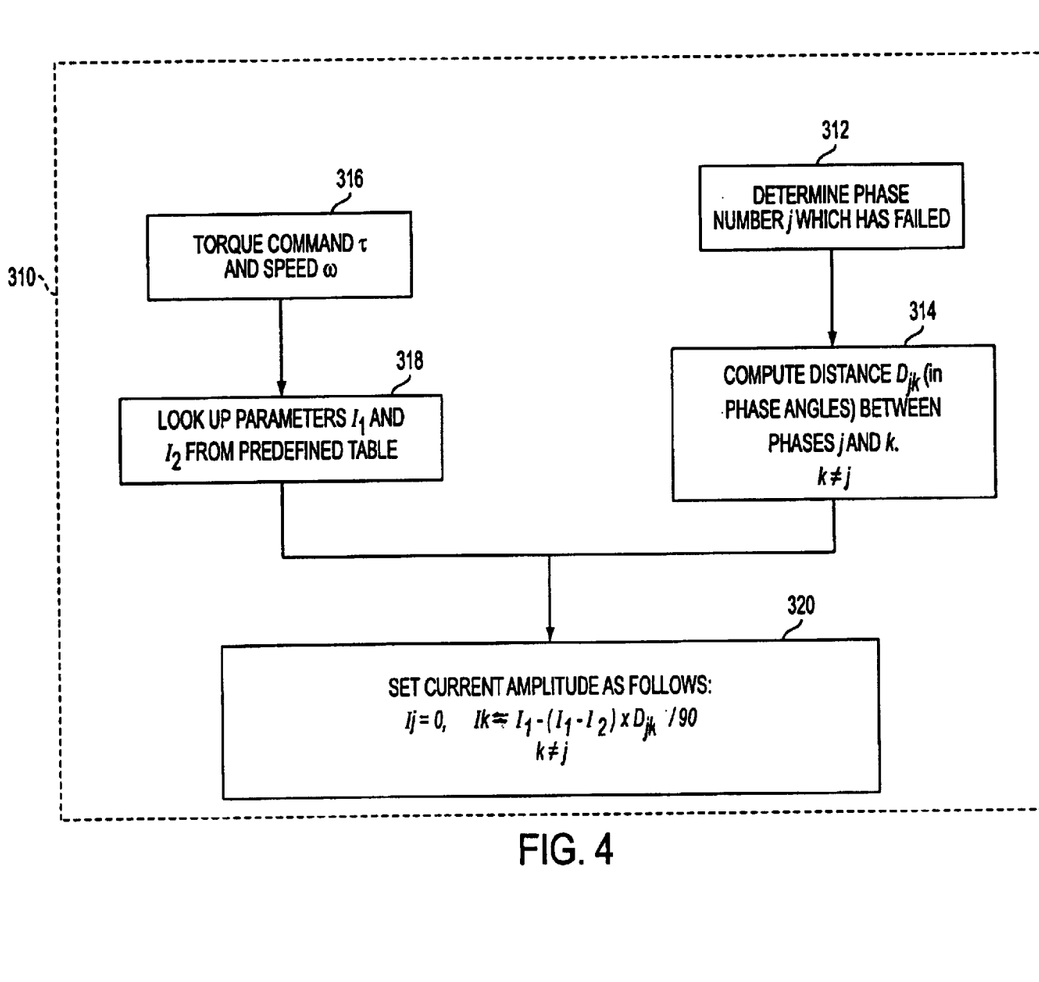
FIG. 4 is a flow-chart illustrating an exemplary fault-correction algorithm of the present invention.

FIG. 4 illustrates an exemplary fault-correction algorithm that may be carried out in the fault-correction mode of operation. The controller 210 identifies failed phase j (step 312), and computes a phase angle offset or distance Djk between the failed phase j and each of phases k that remain operational (step 314), where j and k are integral numbers from 1 to Ns, and Ns is the number of phases in the motor 10.

Further, the controller 210 obtains values of torque $\tau$ requested by the user and motor speed $\omega$ determined by the speed approximator 242 (step 316). These values are used as indexes for accessing a fault-correction look-up table contained in the fault correction unit 260. The fault-correction look-up table contains parameters I1 and I2 utilized for calculation of a desired phase current magnitude for each of the remaining phases k. Parameter I1 represents the maximum current magnitude at a phase location arranged at a predetermined phase angle with respect to the failed phase j. For example, the maximum current magnitude may be at a phase location corresponding to the failed phase j. Parameter I2 represents the minimum current magnitude at a phase angle shifted by 90 degrees from the phase location of the maximum current magnitude. In the fault-correction look-up table, parameters I1 and I2 are provided for various combinations of requested torque and present speed.

In step 318, the controller 210 accesses the fault-correction look-up table to obtain parameters I1 and I2 for the torque and speed determined in step 316. Based on these parameters, the controller 210 in step 320 determines the amplitude Ik of the desired phase current for each phase k that remains operational as Ik=I1−(I1−I2)×Djk/90 degrees. The amplitude Ij of the desired phase current for the failed phase j is set to 0. Hence, the amplitude of the desired phase current for each phase k is set between I1 and I2 depending on the distance of phase k from the failed phase. The modified desired phase current for each phase is used by the controller 210 to determine the control voltage Vi(t) supplied to the respective PE circuit 220 to energize the corresponding phase winding.

Figure 5:
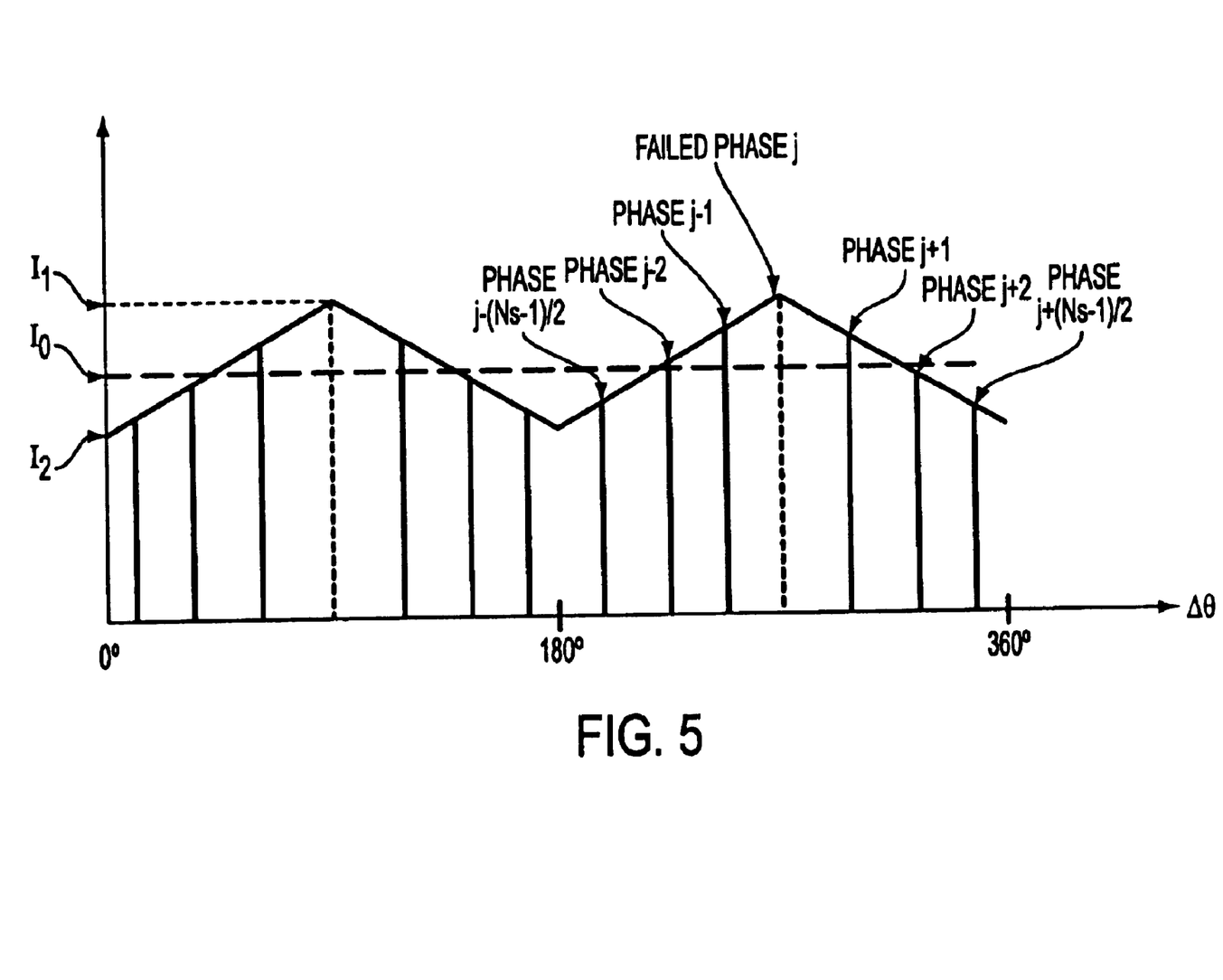
FIG. 5 is a diagram illustrating exemplary pre-set parameters for phase current modification in a fault-correction mode of the present invention.

FIG. 5 is a diagram illustrating the fault-correction algorithm that involves modification of phase currents in accordance with parameters I1 and I2. For example, parameter I1 may represent the phase current magnitude at a phase corresponding to the failed phase j, and parameter I2 may represent the phase current magnitude at a phase angle shifted by 90 degrees with respect to the failed phase j. The controller 210 modifies a phase current magnitude for a phase, which are closer to the failed phase j, to make it higher than a phase current magnitude for a phase, which are more distant from the failed phase j. In particular, modified phase current magnitude for phase j−1, which is the closest phase to the failed phase j, is higher than modified phase current magnitude for the next phase j−2, which in turn is higher than modified phase current magnitude for phase j−(Ns−1)/2, the most distant phase from the failed phase j. Magnitude I0 is a phase current value in each phase before the failure of the phase j.

Figure 6A:
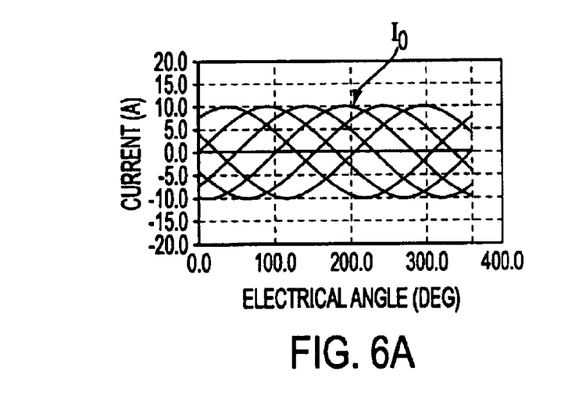
FIGS. 6A and 6B are diagrams illustrating phase current modification in the fault-correction mode.
Figure 6B:
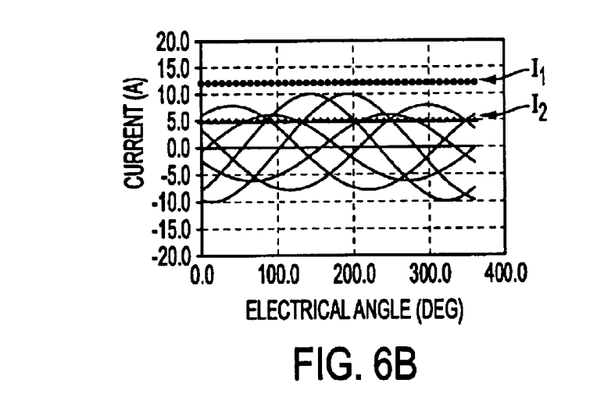

FIGS. 6A and 6B are diagrams respectively showing phase currents in a seven-phase motor without fault correction and with fault correction in accordance with the fault-correction algorithm of the present invention. These diagrams illustrate the case when phase 3 fails, and the phase current for phase 3 is set to 0. Without fault correction, phase currents for phases 1, 2 and 4–7, which remain operational, have magnitude I0 set, for example, to 10 A (FIG. 6A). With fault correction, the controller 210 sets magnitudes of phase currents for operational phases 1, 2 and 4–7 in the range between I1 and I2. For example, I1 may be set to 12 A and I2 may be set to 5 A.

Figure 7:
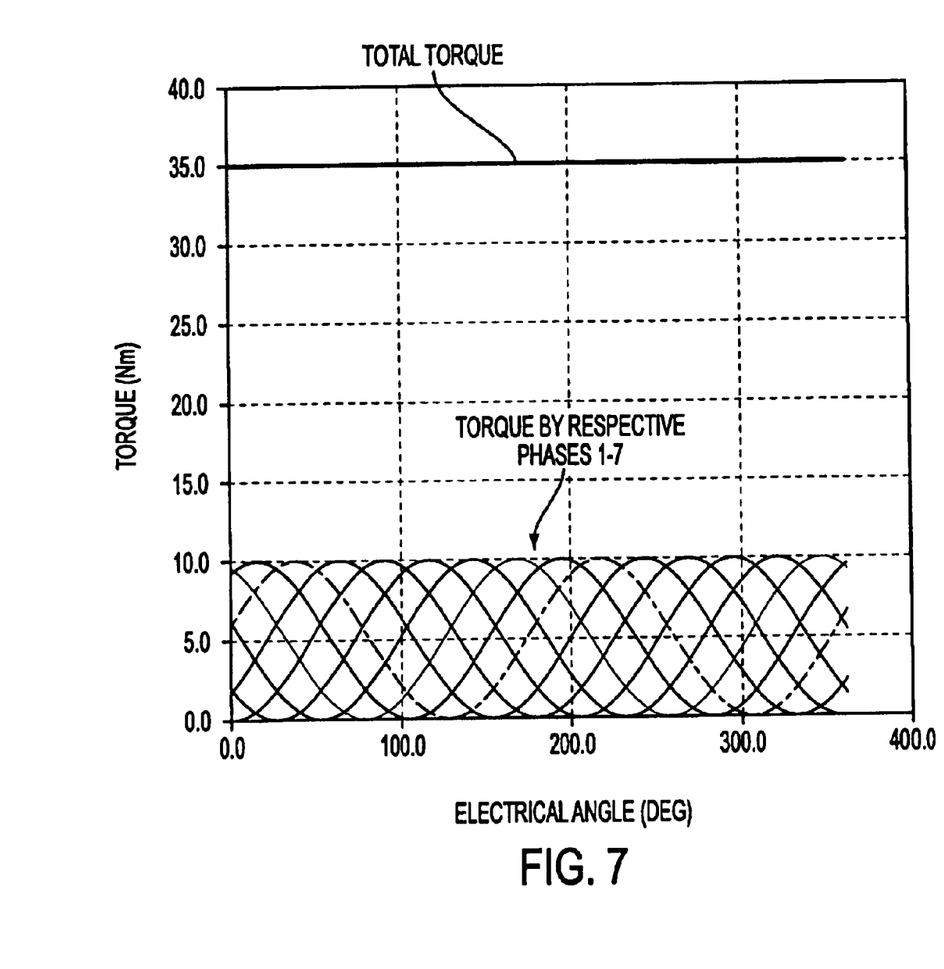
FIGS. 7, 8 and 9 are diagrams illustrating torque produced by each phase to achieve total torque of the motor.
Figure 8:
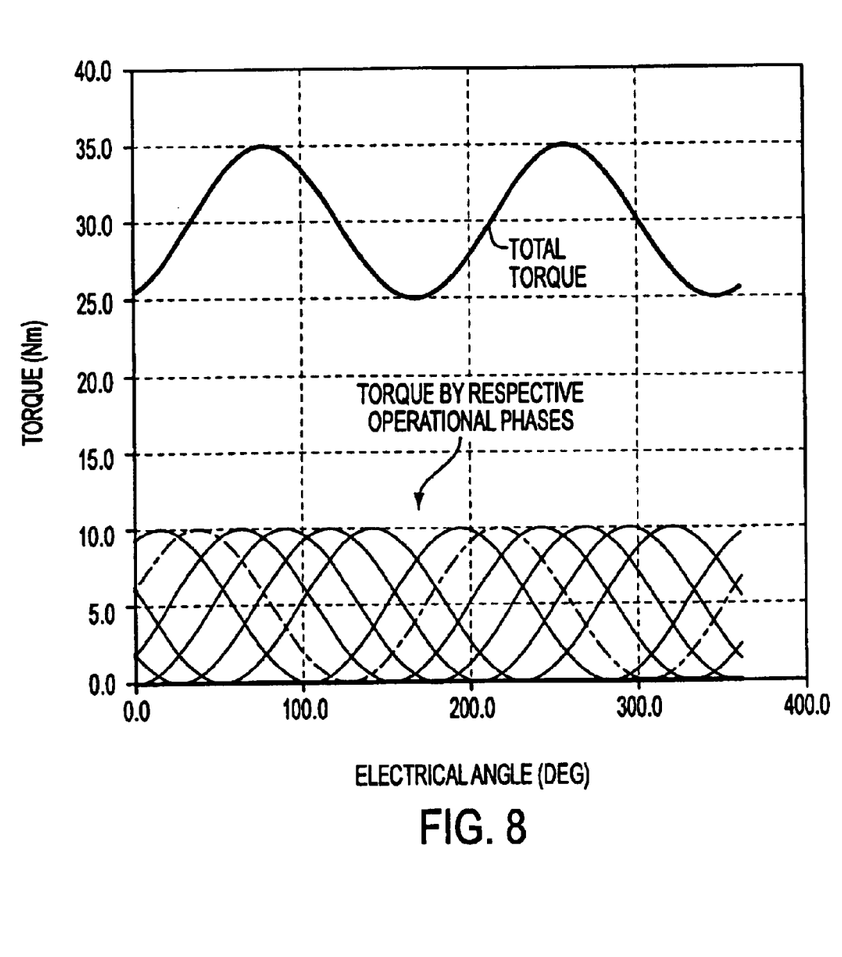

The fault-correction algorithm of the present invention enables the controller 210 to re-distribute phase currents among phases that remain operational to re-balance torque contribution from each phase. FIG. 7 is a diagram showing torque produced by each phase, i.e. torque contribution from each phase of a seven-phase motor in a normal mode of operation for sine-wave profile of phase currents. As all phases are operational, total torque for all phases equal, for example, to 35 Nm may have practically no ripples FIG. 8 is a diagram showing torque contribution from each of operational phases 1, 2 and 4–7, when phase 3 fails but phase currents for the remaining phases are not modified. As illustrated in this diagram, the failure of a phase cause a substantial torque ripple equal, for example, to 0.17 for total torque varying between 25 to 35 Nm.

Figure 9:
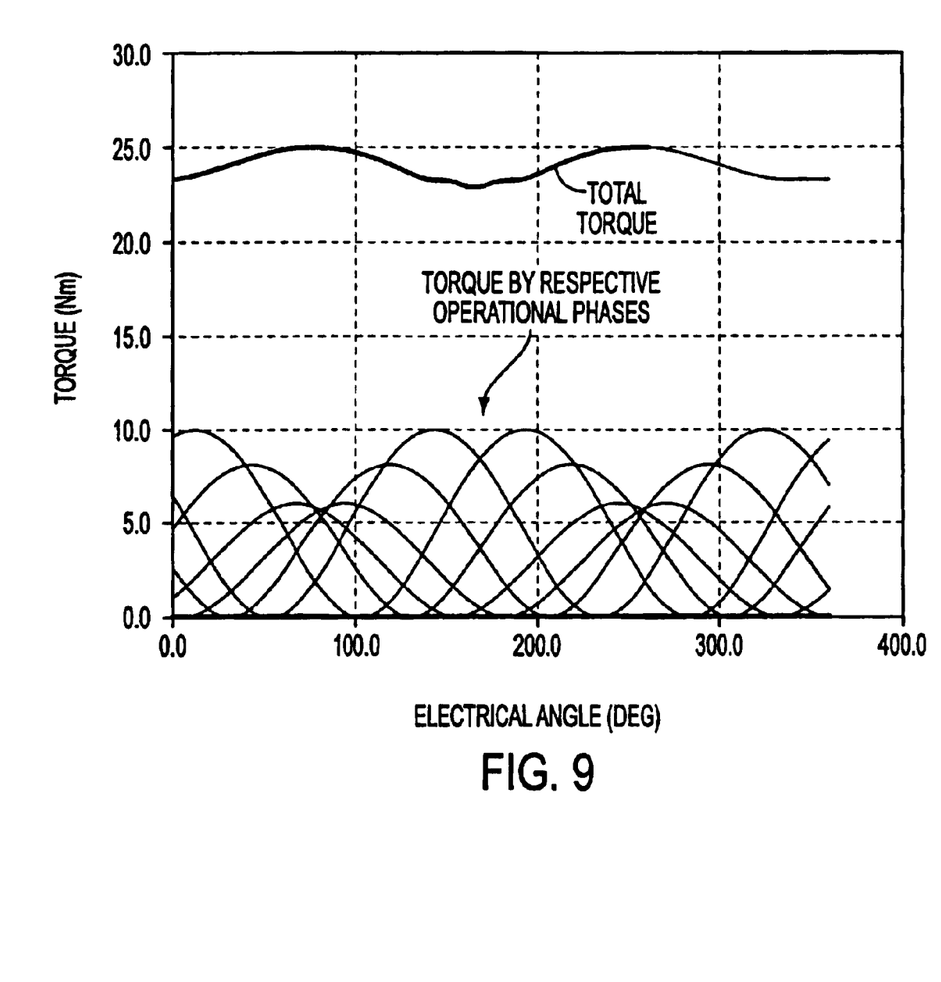

FIG. 9 is a diagram illustrating torque contribution from each of operational phases 1, 2 and 4–7, when phase 3 fails and phase currents for remaining phases are re-distributed in accordance with a fault-correction algorithm of the present invention. As shown in this diagram, torque ripple may be reduced to about 0.04 for total torque varying between 23 and 25 Nm.

To achieve a desired balance between total torque value and torque ripple, values of fault-correction parameters I1 and I2 may be customized in accordance with user's preferences. Therefore, the fault-correction unit 260 may contain several sets of fault correction parameters I1 and I2 for each combination of torque and speed.

For example, to achieve the maximum torque of the motor after a phase is lost, parameter I2 should be selected to be at a level of parameter I1. Moreover, both these parameters should be set to the maximum possible current value. However, such a selection will increase torque ripple. As a result, the motor may become unbalanced. To minimize torque ripple so as to achieve smooth operation of the motor when a phase fails, an optimum difference between values of parameters I1 and I2 may be experimentally established.

Hence, the motor controlled by the control system of the present invention does not need redundant elements in order to continue its operation when a phase fails. The control system gives the user high flexibility by enabling motor fault-tolerant operations with or without fault correction depending on user's preferences and motor conditions. Moreover, fault-correction parameters defining motor characteristics when a phase is lost may be customized in accordance with user's preferences.

Although the invention is disclosed with an example of separated magnetic circuits for each electric phase of the motor, the invention is applicable to other motor arrangements such as motors containing a common magnetic path. Hence, it is to be understood that the invention is capable of changes and modifications within the scope of the inventive concept as expressed herein.

What is claimed is:

1. A control system for a multiphase machine having a plurality of stator phase components and a rotor, each stator phase component comprising a phase winding formed on a core element, said system comprising:
    energization circuitry connected to the stator phase windings for energizing each phase winding;
    a control circuit for defining phase currents for individual phases of the motor to generate control signals for energized phase windings; and
    a mode selection circuit for detecting a failed phase and enabling said control circuit to operate selectively in first and second modes of operation when a phase of the motor fails wherein
    in the first mode of operation, control of phase currents for phases that remain operational is maintained unmodified; and
    in the second mode of operation, control of the phase currents for the phases that remain operational is modified in accordance with specified parameters.

2. The system of claim 1, wherein in the first mode, the control circuit is configured to disable energization of a phase winding corresponding to a failed phase.

3. The system of claim 1, wherein in the second mode, the control circuit is configured to modify phase current of a remaining operational phase in accordance with a difference in electrical angle between the remaining operational phase and a failed phase.

4. The system of claim 1, wherein in the second mode, the control circuit is configured to modify phase current for a remaining operational phase in accordance with a maximum current magnitude at a phase angle in relation to a failed phase.

5. The system of claim 1, wherein in the second mode, the control circuit is configured to modify phase current for a remaining phase in accordance with a minimum current magnitude at a phase angle shifted by 90 degrees with respect to the failed phase.

6. The system of claim 1, wherein in the second mode, the the phase currents are modified in accordance with a user preference from the group consisting of total torque, torque ripple, and machine efficiency.

7. The system of claim 1, wherein in the second mode, an operational phase current is modified to approximately balance effects of total torque and torque ripple.

8. The system of claim 1, wherein the mode selection circuit is pre-programmed by a user to select one of the first and second modes during a phase fault condition.

9. A control system for a multiphase machine having a plurality of stator phase components and a rotor, each stator phase component comprising a phase winding formed on a core element, said system comprising:
    energization circuitry connected to the stator phase windings for energizing each phase winding;
    a control circuit for defining phase currents for individual phases of the motor to generate control signals applied to said energization circuitry for energization of said phase windings; and
    a fault correction circuit responsive to a failure of a phase of the motor for enabling the control circuit to modify phase currents for remaining phases in accordance with pre-set parameter; and
    wherein the core element of each phase component comprises magnetic material that is separate and magnetically isolated from adjacent core elements.

10. A control system for a multiphase machine having a plurality of stator phase components and a rotor, each stator phase component comprising a phase winding, said system comprising:
    energization circuitry connected to the stator phase windings for energizing each phase winding;
    a control circuit for defining phase currents for individual phases of the machine to generate control signals applied to said energization circuitry for energization of said phase windings; and
    a fault correction circuit responsive to a failure of a phase of the motor for enabling the control circuit to modify phase currents for remaining operational phases in accordance with one or more parameters;
    wherein the control circuit is configured to modify phase current for a remaining operational phase in accordance with a phase angle difference between the remaining phase and a failed phase.

11. The system of claim 10, wherein the control circuit is configured to modify phase current for a remaining operational phase in accordance with a maximum current magnitude calculated phase angle location with respect to a failed phase.

12. The system of claim 10, wherein the control circuit is configured to modify phase current for a remaining operational phase in accordance with a minimum current magnitude at a phase angle shifted by 90 degrees with respect to the phase location of the maximum current magnitude.

13. The system of claim 10, wherein the pre-set parameters for phase current modification are customized in accordance with user's preferences.

14. The system of claim 13, wherein phase currents are modified by the control circuit in accordance with parameters that are based on user preferences.

15. The system of claim 10, wherein the amplitude Ik of the phase current for each phase k that remains operational is represented by $$Ik = I1 - (I1-I2) \times Djk/90 \text{ degrees}$$

wherein I1 is a parameter that represents the maximum current magnitude at a phase location arranged at a predetermined phase angle with respect to the failed phase j, I2 is a parameter that represents the minimum current magnitude at a phase angle shifted by 90 degrees from the phase location of the maximum current magnitude, Djk is the distance between the failed phase j and each of phases k that remain operational, and the amplitude Ij of the phase current for the failed phase j is set to 0.

16. A method of controlling a multiphase machine comprising the steps of:

detecting whether a phase of the machine fails, selecting between a first and a second mode of operation if a phase failure has been detected in the detecting step, in response to selection of the first mode of operation in the detecting step, maintaining control of phase currents for phases that remain operational without modification, and in response to selection of the second mode of operation in the detecting step, modifying control of the phase currents for the phases that remain operational in accordance with one or more parameters.

17. The method of claim 16, further comprising the step of disabling energization of a phase winding corresponding to a failed phase in response to selection of the first mode of operation.

18. A method of controlling a multiphase machine comprising the steps of:

detecting a phase failure, and modifying phase currents for phases that remain operational in accordance with one or more parameters;

wherein phase current for a remaining operational phase is modified in accordance with a phase angle difference between the remaining phase and a failed phase.

19. The method of claim 18, wherein phase current for a remaining operational phase is modified in accordance with a maximum current magnitude at a determined phase angle location with respect to a failed phase.

20. The method of claim 18, wherein phase current for a remaining operational phase is modified in accordance with a pro-set minimum current magnitude at a phase angle shifted by 90 degrees with respect to the phase location of the maximum current magnitude.

21. The method of claim 18, wherein phase currents are modified by the control circuit in accordance with parameters that are based on user preferences.

22. The method of claim 21, wherein an operational phase current is modified to approximately balance effects of total torque and torque ripple.

* * * * *